United States Patent [19]
Barabash et al.

[11] Patent Number: 5,267,349
[45] Date of Patent: Nov. 30, 1993

[54] FAST DETERMINATION OF SUBTYPE RELATIONSHIP IN A SINGLE INHERITANCE TYPE HIERARCHY

[75] Inventors: William Barabash, Acton; Steven A. Kirk, Chelmsford; William S. Yerazunis, Marlboro, all of Mass.

[73] Assignee: Digital Equipment Corporation, Maynard, Mass.

[21] Appl. No.: 488,880

[22] Filed: Mar. 6, 1990

[51] Int. Cl.[5] .............................................. G06F 15/18
[52] U.S. Cl. ...................................................... 395/62
[58] Field of Search ......................... 371/67.1; 364/513

[56] References Cited

U.S. PATENT DOCUMENTS 4,506,325  3/1985  Bennett et al. ....................... 364/200

OTHER PUBLICATIONS

Aho, A. V., et al, Compilers Principles, Techniques, and Tools, Addison-Wesley, 1986, pp. 352-355.
Tanenbaum, A. S., Structured Computer Organization, Prentice-Hall, 1984, pp. 235-240.
Date, C. J., An Introduction to Database Systems, vol. I. 4th Ed., Addison-Wesley, 1986, pp. 75-80.
Walker, A., et al, Knowledge Systems and Prolog, Addison-Wesley, 1987, pp. 339-341.
Forgy, C. L., "Rete: A Fast Algorithm for the Many Pattern/Many Object Pattern Match Problem", Artificial Intelligence, 19, 1982 pp. 17-37.

Primary Examiner—Michael R. Fleming
Assistant Examiner—Robert W. Downs
Attorney, Agent, or Firm—Kenyon & Kenyon

[57] ABSTRACT

A system and method for quickly determining whether a requested object is an ancestor of a particular object where both objects are contained in a single inheritance type hierarchy. The system encodes each object in memory with a binary pattern that indicates the ancestry of the object and a mask which indicates which bits of the binary pattern are significant for determining ancestry. This allows a system, upon receiving a request for an object, to determine in only two steps whether any particular object in memory can satisfy the request as a sub-type of the requested object.

9 Claims, 4 Drawing Sheets

FIG. 3

| OBJECT | LEVEL | $A_N$ | $X_N$ | $P_N$ |
|--------|-------|-------|----------|----------|
| 10 | 1 | 0 | 10000000 | 00000000 |
| 12 | 1 | 1 | 10000000 | 10000000 |
| 14 | 2 | 00 | 11100000 | 00000000 |
| 16 | 2 | 01 | 11100000 | 00100000 |
| 18 | 2 | 00 | 11100000 | 10000000 |
| 20 | 2 | 01 | 11100000 | 10100000 |
| 22 | 2 | 10 | 11100000 | 11000000 |
| 24 | 3 | 00 | 11111000 | 10000000 |
| 26 | 3 | 01 | 11111000 | 10001000 |
| 28 | 3 | 10 | 11111000 | 10010000 |
| 30 | 3 | 00 | 11111000 | 11000000 |
| 32 | 3 | 01 | 11111000 | 11001000 |
| 34 | 4 | 000 | 11111111 | 11000000 |
| 36 | 4 | 001 | 11111111 | 11000001 |
| 38 | 4 | 010 | 11111111 | 11000010 |
| 40 | 4 | 011 | 11111111 | 11000011 |
| 42 | 4 | 100 | 11111111 | 11000100 |
| 44 | 4 | 000 | 11111111 | 11001000 |
| 46 | 4 | 001 | 11111111 | 11001001 |

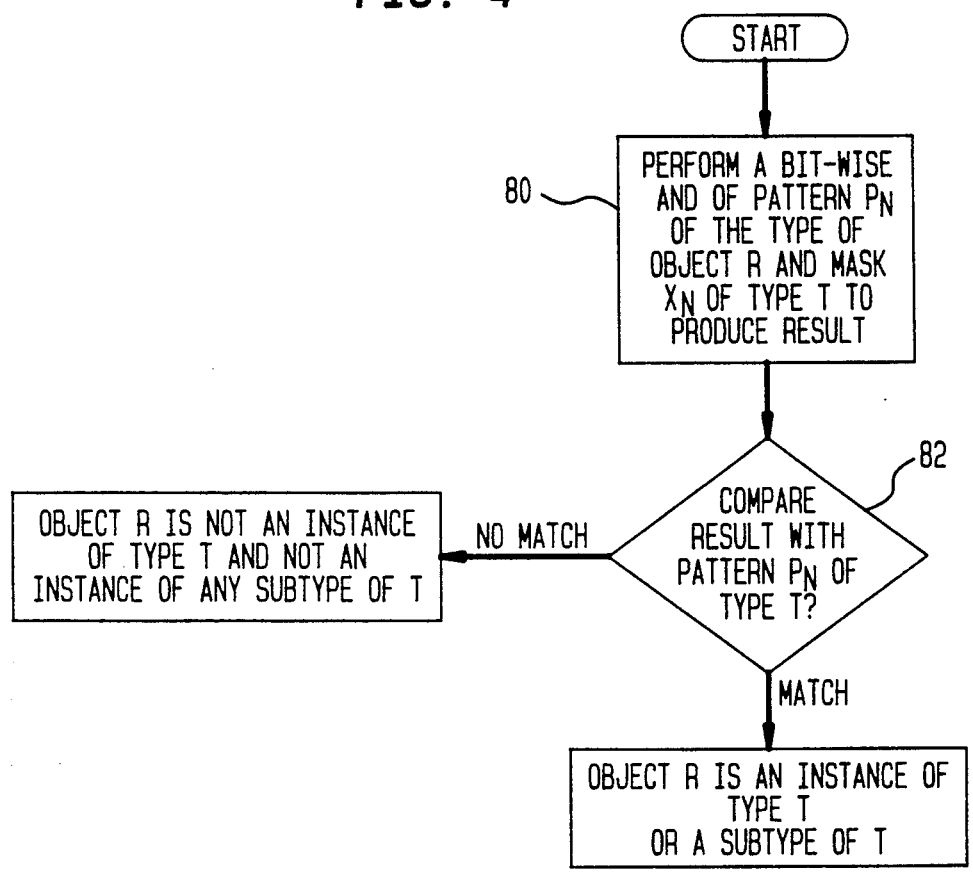

FAST DETERMINATION OF SUBTYPE RELATIONSHIP IN A SINGLE INHERITANCE TYPE HIERARCHY

FIELD OF THE INVENTION

The present invention relates to artificial intelligence and more specifically, to a method for fast determination of the subtype relationship in a single inheritance type hierarchy for a rule-based language.

BACKGROUND OF THE INVENTION

Rule-based languages, used in artificial intelligence applications such as expert systems, are advantageous when there is a large amount of data to be searched and actions are taken based on the results of the search. In order to minimize the searching through this large amount of data, rule-based languages take the information that is available about what is the best approach to a problem and attempt a solution.

A single instruction in a rule-based language takes the form of "when these conditions are met, then do these actions". In other words, the instruction checks to see if certain conditions are met, and if they are, then a number of actions are performed. In a rule-based language, there is no organized flow of control, rather the computer will look for situations and patterns. In other words, a rule-based language is a pattern matching language. For example, one of the instructions may be "when there is object of type A, an object of type B and an object of type C in the data base, then do X, do Y and do Z".

In all rule-based languages, there is a distinction made between the types of data and instances of those types. This distinction is exactly analogous to the distinction made in data bases between a record format and actual records. For example, a particular application could declare a type, BOOK. All instances of the type BOOK contain the same kinds of information: a title, an author, a catalog number, and a page count. This application could then create an instance of type BOOK for each book in the town library. One such instance might contain the following information.

title: "Artificial Intelligence and You"
author: Smith, John
catalog number: 0-670-81442-3
page count: 285

This instance of type BOOK (also referred to as data of type BOOK, an object of type BOOK, or a BOOK object) could potentially satisfy any condition in any rule which is searching for an object of type BOOK.

When the notation of "type inheritance" is introduced, which is a powerful extension to the capabilities of a rule-based language, the situation becomes more complicated. Type inheritance involves the concept of one object type being a subtype of another object type. For example, in a particular application, the type CAT could be declared to be a subtype of the type MAMMAL, and MAMMAL a subtype of VERTEBRATE, and VERTEBRATE a subtype of ANIMAL. The type CAT inherits certain features of the type MAMMAL, since it is a subtype. Examples of features that the subtype CAT inherits from the parent type MAMMAL (i.e. the supertype) could include the characteristics of nursing its young, warm-blooded, etc. The other thing which a type inherits from its parent type is membership. Although any object is an instance of one and only one type, it can usually be used as if it were an instance of any of its supertypes. Thus, a CAT object could satisfy a requirement for an instance of type MAMMAL, or a requirement for an ANIMAL.

Type inheritance is a powerful concept because it maps directly to the way the real world is described by human beings. The English language already has categories like ANIMAL, sub-categories like MAMMAL, and sub-sub-categories like CAT, and instances like John Smith's 3 year old siamese cat. If a school teacher says, "Bring in an animal for show and tell," then every child in the class would know that John Smith's 3 year old siamese cat would satisfy the teacher's request, but so also would a frog or a hamster.

Using a rule-based programming language, a computer will attempt to match every piece of data against every type or subtype that appears as a pattern being matched. For example, if the pattern being matched is MAMMAL, the computer will compare the type of every piece of data in the data base against the type MAMMAL and every subtype of MAMMAL. If a MAMMAL is being searched for among the data to satisfy a rule, then any data of type CAT should satisfy the requirement for a MAMMAL, since CAT is a subtype of MAMMAL. To do this method of searching and matching, however, the type/subtype relationships between the types (a "type hierarchy") must be known.

The determination of the subtype relationship (i.e. whether a specified type is equal to or is a subtype of some other specified type), and more specifically the membership relationship (i.e. whether a specific object can be treated as if it were an instance of a specified type, which is true if and only if the type of the object is equal to or is a subtype of the specified type), is a critical operation in the overall performance of a pattern matching language, such as a rule-based language. Therefore, the determination should be done as quickly as possible, but without greatly increasing the memory space. The term "single inheritance" means that a subtype can have only one immediate parent type in the type hierarchy.

One method of determining membership involves checking the type of the data to see whether that type is the same type as the type that is being matched, and if that fails checking the supertype of the data against the match type. This checking is done against subsequently higher and higher supertypes until either the supertype and the match type are equivalent (i.e. the object is a member of the match type), or there are no more supertypes to compare (i.e. not a member of the match type). With such an approach, a large number of levels may have to be searched before a match or a mismatch is found. For example, it takes two checks to determine that a CAT object can satisfy a match type of MAMMAL; first CAT is compared to MAMMAL, then the supertype of CAT, MAMMAL is compared to MAMMAL and found to be equivalent. However, to determine that the same CAT object will not satisfy a match type of VEGETABLE takes four checks: CAT compared to VEGETABLE, MAMMAL compared to VEGETABLE, VERTEBRATE compared to VEGETABLE, and ANIMAL compared to VEGETABLE. Such an approach, because of these multi-level searches, especially on mismatches (which are almost always far more common than matches), would degrade the performance of a rule-based language to a totally unacceptable level.

Another approach to determining the subtype relationship is to link a set of comparisons together with logical OR's. For example, if a condition in a rule will match if it finds an instance of a MAMMAL, then this is equivalent to matching if it finds a MAMMAL object, or a CAT object, or a DOG, or a HORSE, or a COW, et cetera, for all the subtypes of MAMMAL, and for all sub-subtypes and sub-sub-subtypes, et cetera. This approach becomes very slow and cumbersome whenever the type hierarchy is of any appreciable size.

Another approach for providing knowledge of the subtype relationship would be to provide $N^2$ space in memory when N is the total number of types. Each axis would list each of the separate types in a grid format. Every point in the grid corresponds to an intersection of one type with another type and will contain a bit. If the bit is a 1, then the type (such as CAT) on one axis is a subtype of the type on the other axis of the grid, for example, MAMMAL. If the bit is a 0, then the type (CAT) on one axis of the grid is not a subtype of the type on the other axis of the grid (for example, AMPHIBIAN). The obvious drawback to this approach is the extremely large amount of memory space that would be needed when the total number of types in an application is large; for example, when N is equal to $10^4$, (an entirely reasonable number of types for an application—e.g. the number of parts in a modern aircraft) the amount of memory space needed would be $10^8$.

There is therefore a need for a method of quickly determining the subtype relationship in a single inheritance type hierarchy, which finds usefulness in computer programmed with a rule-based language, without increasing greatly the amount of memory space or instructions needed for implementation.

SUMMARY OF THE INVENTION

This and other needs are provided by the present invention which quickly determines the subtype relationship in a single inheritance type hierarchy. Using Huffman coding, a well-known technique, each specific type in a type hierarchy is provided with a specific binary value. Furthermore, each specific type is also provided with a mask that represents the number of bits of the specific binary value that will be significant for matching purposes. By using the mask and the specific binary value that represents a specific type, the relationship between any two types in the type hierarchy can be found in a two-step process. This process involves masking off those bits which are not necessary for comparison, and then performing a match of the pattern of one type to the other type. Each pattern contains within it encoded information from which it can be determined in a simple manner each of the parent types of that subtype.

BRIEF DESCRIPTION OF THE DRAWINGS

FIG. 3 is a table of the objects of the type hierarchy of FIG. 1 and the bit patterns for these objects created using the compilation process of FIG. 2.

FIG. 4 is a flow chart of an embodiment of the execution process to the present invention.

DETAILED DESCRIPTION

Figure 1:
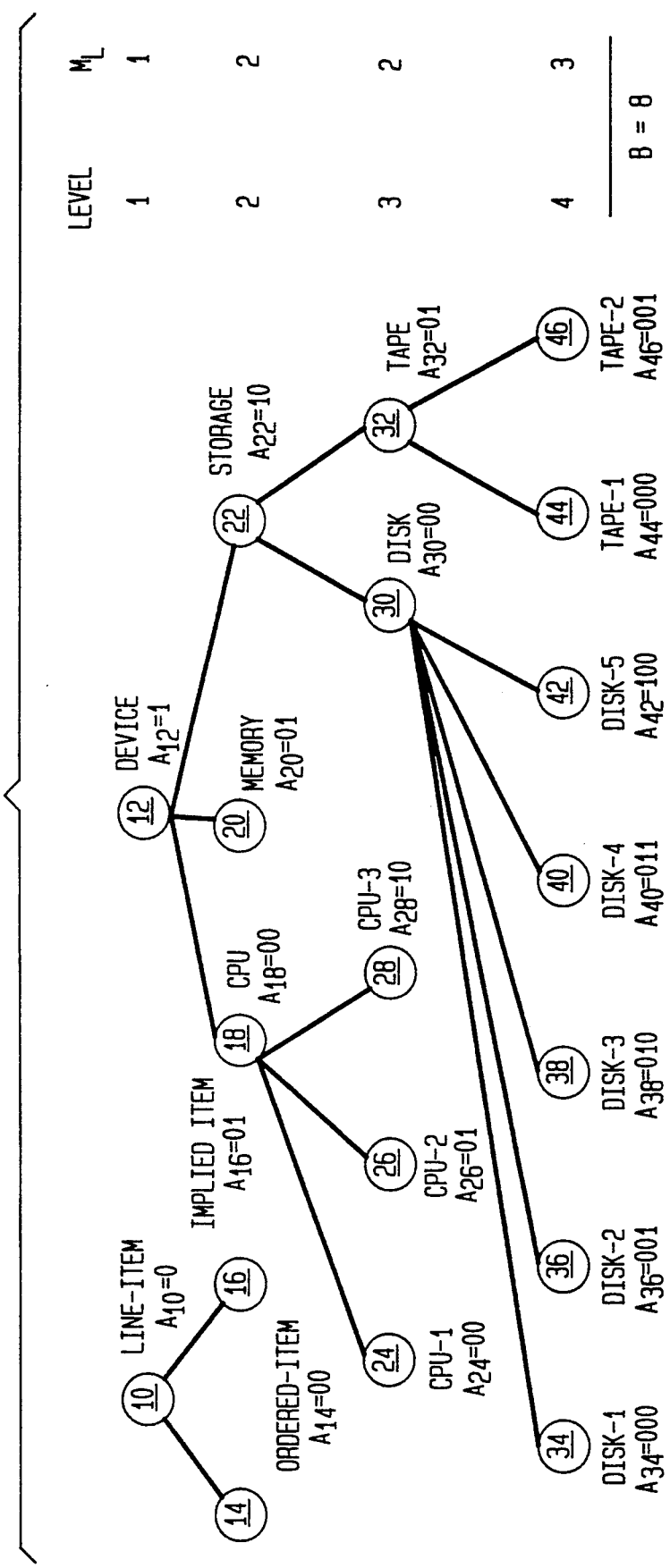
FIG. 1 illustrates an example of a type hierarchy for an application which processes orders for computer equipment.

In certain artificial intelligence applications such as expert systems the capability of organizing all the types of data into a hierarchy is very important. A type hierarchy shows the relationships between all the types in a system. An example of a type hierarchy is shown in FIG. 1. Each circle in the figure represents a different type in the hierarchy, and each has been numbered for convenient reference. Each line connecting the types in the figure represents a connection between a supertype (a.k.a. a parent type) and its subtypes (a.k.a. children types). As exemplified in the figure, a type can have at most one supertype, but it can have many subtypes.

Level 1 of the type hierarchy of FIG. 1 includes LINE-ITEM 10 and DEVICE 12. These two types, the LINE-ITEM 10 and the DEVICE 12 of level 1, are considered to be "siblings" since they are the only objects in level 1. The LINE-ITEM 10 has two children, ORDERED-ITEM 14 and IMPLIED-ITEM 16. The ORDERED-ITEM 14 and the IMPLIED-ITEM 16 are considered to be siblings, and are subtypes of the LINE-ITEM 10. Similarly, the DEVICE 12 in level 1 has a number of children types, a central processing unit (CPU) 18, a MEMORY 20 and a STORAGE 22. Each of these children types represents a different subtype of the type represented by the DEVICE 12. It should be understood that FIG. 1 represents the relationships between types and subtypes, and that the hierarchy does not represent the actual physical connection of the elements of a computer system.

The CPU 18 has three children 24-28, each of which represents a different subtype of CPU. In other words, the type CPU-1 numbered 24 is one specific subtype of CPU, while the type CPU-2 numbered 26 is a different subtype of CPU and could, for example, be manufactured by different companies. The different CPU subtypes 24, 26, 28 are all found in level 3 of the type hierarchy. The type STORAGE 22 has two children, DISK 30 and TAPE 32. The DISK 30 and the TAPE 32 are not siblings of the CPU subtypes 24, 26, 28 although they are siblings of each other.

Finally, there are five different subtypes of DISK 30 shown in the example of FIG. 1, these different subtypes of DISKS being designated as 34, 36, 38, 40 and 42. Each of these different types represents a different subtype of DISK 30. The TAPE 32 has two different subtypes, 44 and 46. The different subtypes of disks and tapes make up level 4. As seen in FIG. 1, a subtype can only have one parent type (or "supertype"). This is referred to as "single inheritance" type hierarchy. Inheritance means the characteristics of a type are inherited by a subtype, unless specifically noted otherwise. These characteristics can include default values, membership and basic structure of information. For example, type 44, TAPE-1, is a subtype of TAPE 32. Therefore, the type 44 will inherit the same default values or characteristics that characterize TAPE 32. As another example, type 42, DISK-5, will inherit features from its supertype (DISK 30) and the supertypes of the DISK 30 (i.e. the STORAGE 22 and the DEVICE 12). Thus, type 42 (representing a specific subtype of DISK) can be considered to be a subtype of any of the supertypes DISK 30, STORAGE 22, or DEVICE 12.

In a rule-based programming language, it is often the case that problems are described in general terms. However, in solving the problem, it is specific objects that are considered when searching the data base. For example, if the solution to a problem requires a DISK and an object of type 42, DISK-5, is considered, the question becomes whether that object satisfies the need for a disk. In other words, it must be determined whether type 42, DISK-5, is a subtype of DISK 30. Similarly, if some type of storage 22 is needed, and object of type 42, DISK-5, is considered, it must be determined whether that object will satisfy this higher level type.

Figure 2:
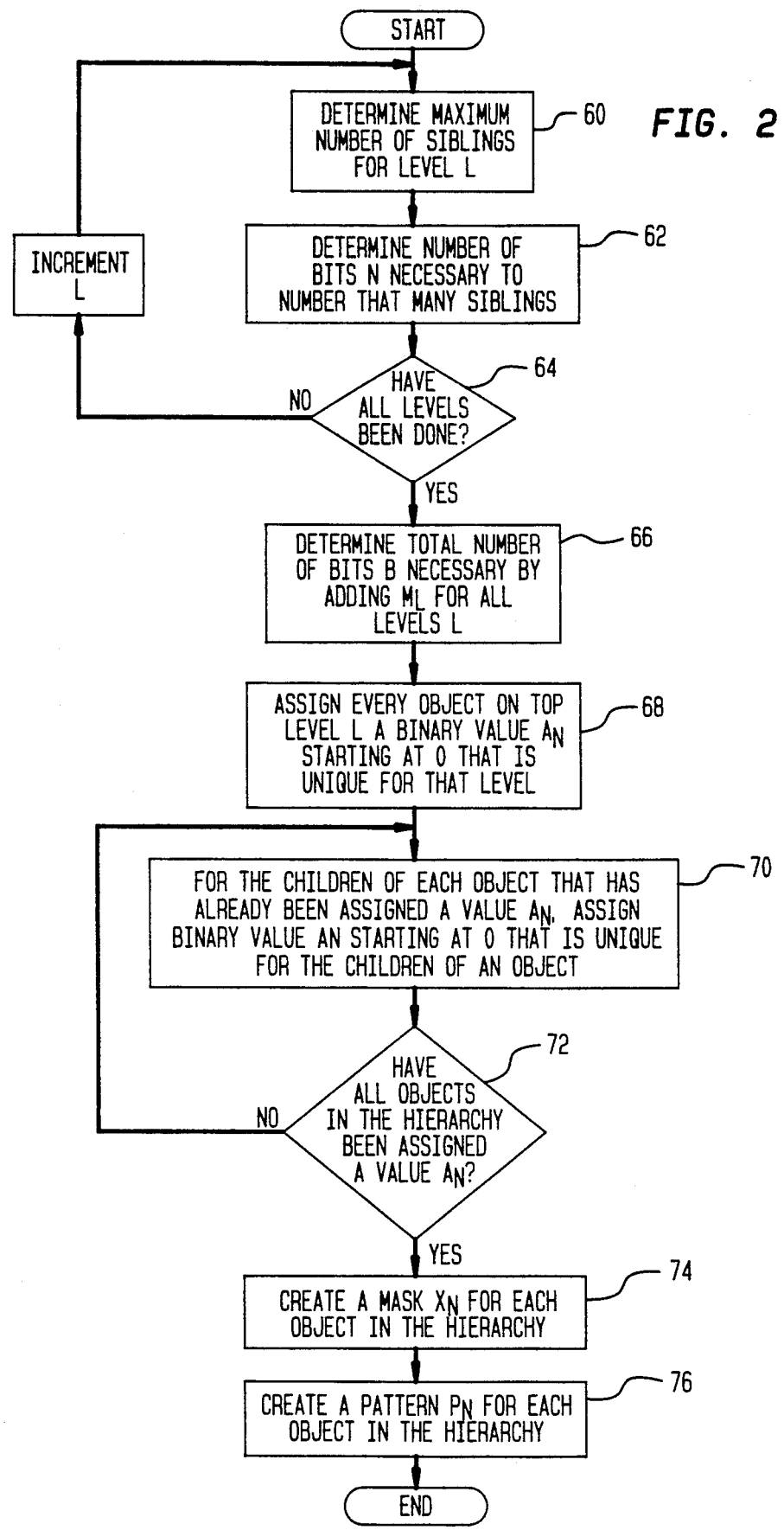
FIG. 2 is a flow chart of an embodiment of the compilation process according to the present invention.

The present invention provides for most of the work in determining whether a specified type is equal to or is a subtype of another specified type to be done at compilation. In other words, the determining of the subtype relationship is performed, as much as possible, as part of the compilation process. The present invention uses a coding technique, known as Huffman coding, in order to encode non-redundant objects as a set of binary values. The following explanation of the encoding and compilation process will be made with reference to FIGS. 2 and 3. FIG. 2 describes the compiling process itself, while FIG. 3 shows the results of the compiling process.

FIG. 3 is a table that lists for each type of FIG. 1 the level that the type is found on, a first binary number $A_N$, a second binary number $X_N$ and a third binary number $P_N$ for each type in the type hierarchy. How this table is generated is described below with reference to FIG. 2, while how the numbers ar used will be described with reference to FIG. 4.

FIG. 2 is a flow chart of the compilation process that generates a value for each type as shown in FIG. 3. At the start of the compilation process, a maximum number of siblings is determined for each of the levels in the type hierarchy in execution step 60. Siblings are those types on a level in the type hierarchy which share the same parent. There can be many groups of siblings on the same level. All types on the first level are considered siblings.

Once the number of siblings in the largest group of siblings on a level is determined, the number of bits ($M_L$) needed to uniquely number that many siblings is determined in execution step 62. For example, the number of siblings in the largest group on level 4 are 5. Therefore, in order to uniquely identify any one of those five siblings (types 34–42) a three-bit binary number is needed. This is the number ($M_4=3$) that is determined in execution step 62. The same number of bits is used for the rest of the groups of siblings on that level also.

Once the number of bits needed to identify the maximum number of siblings in a level is determined in execution step 62, it is determined in decision step 64 whether execution steps 60 and 62 have been performed for each of the levels in the type hierarchy. Once these steps 60, 62 have been performed for each level, the total number of bits necessary to uniquely identify an object in the hierarchy is determined in execution step 66. The total number of bits necessary, B, is determined by adding the values of $M_L$ for all of the levels in the type hierarchy.

Every object in the top level (level 1) is assigned a binary number $A_N$ which is $M_1$ bits long. In this example, $M_1$ is equal to one bit. Each of the types are assigned a number starting at 0. This is performed in execution step 68. In execution step 70, for every type in the hierarchy which has already been assigned an $A_N$ value but whose children have not been assigned values, an $M_L$ bit binary number $A_N$ is assigned to each of its children starting at 0. Thus each group of siblings starts a numbering series with "$A_N=0$, $A_N=1$ ... " This is performed until all of the types in the type hierarchy have been assigned a value $A_N$, as determined in decision step 72.

Once each of the types in the type hierarchy has been assigned a value $A_N$, a mask $X_N$ N is created for each type in execution step 74. Each mask $X_N$ is B bits long. The mask $X_N$ is formed by starting at the left-most bit with a number C of 1's, and is then right-filled with 0's. This is done according to the equation:

$$C = \sum_{L=1}^{Q} M_L$$

where Q is the level of the object whose mask is being formed.

Finally, in execution step 76, a pattern $P_N$ is created for every type N in the type hierarchy. This pattern $P_N$ is B bits long and is formed by starting at the left-most bit and concatenating the $A_N$ values for all of the type's ancestors. This is done by beginning with the bits $A_1$ for the top level ancestor and concatenating the bits through each successive ancestor ($A_2$, $A_3$ etc.) until its own $A_N$ value is concatenated. The remaining bits in the pattern $P_N$ are right-filled with 0's.

Referring to FIG. 3, it can be seen that the $A_N$ created for every type uniquely identifies that type from among its siblings using a minimum number of bits. For example, type 36 is one of five siblings. Each of the five siblings 34–42 are assigned a unique (to that sibling group) three-bit number $A_N$. Similarly, the two other siblings 44 and 46 belonging to the other group of level 4 are each assigned separate values $A_N$.

From the values of $A_N$, each of the patterns $P_N$ that identify a single type in the type hierarchy is created. For example, for type 28, the top level ancestor is device 12 which has an $A_N$ of 1. Thus the left-most bit of $P_N$ for object 28 is a 1. The next lower level ancestor for type 28 is CPU 18. The value of $A_N$ for CPU 18 is 00. This value of for CPU 18 is concatenated with 1, the $A_N$ for type 12. The value of AN of type 28, (i.e. 10), is then concatenated with the values of $A_N$ of types 12 and 18. This forms the binary number 10010. Finally, three zeros are right-filled to complete the pattern $P_N$. In this manner, a pattern $P_N$ is created that identifies the object 28 in the type hierarchy.

The mask $X_N$ is a mask that reflects how many bits of a pattern $P_N$ will be significant for matching purposes. Because the $M_L$ value for the first level is 1, a single binary digit (one) 1 is put into the left-most bits of the value $X_N$ for each of the types in the hierarchy. For each of the types on level 2, since the number of bits needed to encode each of the types is equal to 2, two one bits are concatenated to the left-most bit for the mask $X_N$.

Similarly, for level 3, two more bits are used in the values of $A_N$ for each of the types on level 3. Therefore, two more 1's are placed into the mask $X_N$ for each of the types on level 3. Finally, for the lowest-most level, level 4, three bits are needed for $A_N$. Therefore, three 1's are placed into the remaining bits of $X_N$ for each of the types in the fourth level.

The mask $X_N$ is used in the matching process in order to determine how many left-most bits of two patterns $P_N$ need to be compared to determine whether an object is a type or subtype of another object in the type hierarchy. The determination of whether an object can be used as if it were an instance of a specific type is shown in FIG. 4, which is a flow chart of the execution or matching process.

For the following example, assume that there is an object of type R for which it is to be determined whether that object can be treated as if it were an instance of the of the type T (i.e. whether R is equal to T or is a subtype of T). In execution step 80, a bit-wise AND of the pattern $P_N$ of type R is performed with the mask $X_N$ of type T to produce a result.

In the second execution step 82, the result generated above is compared with the pattern $P_N$ of type T. If the patterns match, then the object of type R can be considered to be of type T. If the result does not match the pattern $P_N$ of type T, then the object is not of type T or of any of the subtypes of type T.

As an example, assume that we are attempting to find objects which match type 22, STORAGE; thus for this example, type STORAGE is used as T in the process of FIG. 3.

Now assume that the first object to be compared is an instance of type 36 (DISK-2). By the process of FIG. 3, the pattern $P_{36}$, is bit-wise AND'ed with mask $X_{22}$. $P_{36}$ is 11000001, $X_{22}$ is 11100000, and the result of the bit-wise AND is 11000000. This result is then compared to $P_{22}$, 11000000, and because they are exactly the same, then the object of type 36 (DISK-2) can indeed satisfy the requirement for an object of type 22 (STORAGE).

Now assume that the next object to be compared is of type 24 (CPU-1). Again, by the process of FIG. 3, the pattern $P_{24}$, 10000000, is bit-wise AND'ed with the mask $X_{22}$, 11100000, and the result, 10000000, is then compared to the pattern $P_{22}$, 11000000. In this case, because they are not equivalent, the object cannot be used to satisfy the requirement for an object of type 22 (STORAGE).

When there is no match, using this same two-step execution process will indicate that an object of type R is not of type T or a subtype of type T. This avoids the problem of having to check intermediate types all the way up the type hierarchy when the type T is on a high level in the hierarchy. With the present invention, the object of type R can be directly compared with type T to determine if it is a type or subtype of T, even though there may be intermediate levels of subtype relationships between type R and type T.

Thus, once the initial compilation has been performed, the determination of whether or not an object of one type is to be considered to be an object of type T or any subtype of type T, can always be performed in two steps. The number of steps remains constant no matter which type of object is matched to a specific type. Further, the amount of memory space needed for this system is approximately ln(N) per type, where N is the total number of types defined.

The invention described above can be implemented on a conventional computer usable for artificial intelligence applications, and as such, the computer itself is not shown in detail. However, one example of a commercial computer which can be used with the present invention is a DEC Station 3100, manufactured by Digital Equipment Corporation.

What is claimed is:

1. A method of operating a computer having a database to determine an ancestral relationship between first and second objects of a plurality of objects in the database, said method comprising the steps of:

organizing the objects in the database according to a single inheritance type hierarchy having a plurality of levels;

providing each one of the plurality of objects in the database with a corresponding unique binary number, a binary bit pattern and a mask, each of the binary bit patterns containing information which identifies ancestors of the corresponding object in the single inheritance type hierarchy, and the mask containing information as to how many bits in said binary bit pattern are significant;

operating the computer to perform a bit-wise AND of the binary bit pattern of the first object with the mask of the second object to produce a result; and operating the computer to compare said result with the binary bit pattern of the second object, a match indicating to the computer that the first object is either an instance of the second object or an ancestral object of the second object, and a nonmatch indicating to the computer that the first object is neither an instance of the second object nor an ancestral object of said second object.

2. The method of claim 1, wherein the step of providing includes the step of performing Huffman coding on each one of the plurality of objects in the database.

3. The method of claim 1, wherein the step of providing includes the steps of:

determining a maximum number of siblings for each level of the single inheritance type hierarchy;

determining for each level of the single inheritance type hierarchy a minimum number of bits $M_L$ needed to uniquely number a maximum number of siblings for the respective level;

adding together the minimum number of bits $M_L$ for each level in the single inheritance type hierarchy to obtain a value B, which equals a total number of bits necessary to uniquely identify each one of the plurality of objects in the database;

assigning each one of the plurality of objects in database a value $A_N$ which has $M_L$ bits, wherein the value $A_N$ is unique for each one of the plurality of objects with respect to its siblings;

concatenating the values $A_N$ for each one of the plurality of objects, with a left-most bit being a first digit of the value $A_N$ of a top level object, and successively next left-most bits that are concatenated being the remaining digits of the top level object followed by the values $A_N$ of each of an object's ancestors; and right-filling with 0's the concatenated values of $A_N$ until the concatenated values of $A_N$ with right-filled 0's has the total number of bits B to form the binary bit pattern for each one of said plurality of objects.

4. The method of claim 3, wherein, subsequent to determining $M_L$ and B, the step of providing further includes the step of forming said mask by filling left-most bits of a binary number B bits long with a number C of 1's and right-filling with 0's where C=

$$C = \sum_{L=1}^{Q} M_L,$$

Q being the level L of an object having the mask that is being formed.

5. A computer programmed to identify a first object as an ancestral object of a second object said computer comprising:
- a database adapted to store a plurality of objects according to a single inheritance type hierarchy including a plurality of levels;
- means for providing each one of the plurality of objects in the database with a corresponding unique binary number, a binary bit pattern and a mask, each one of the binary patterns containing information which identifies ancestors of the corresponding object in the single inheritance type hierarchy, and the mask containing information as to how many bits in said binary bit pattern are significant;
- means for performing a bit-wise AND of the binary bit pattern of the first object with the mask of the second object to produce a result; and
- means for comparing said result with the binary pattern of the second object, a match indicating to said computer that the first object is either an instance of the second object or an ancestral object of said second object, and a nonmatch indicating the first object is neither an instance of the second object nor an ancestral object of the second object.

6. The computer of claim 5, wherein, the means for providing, the means for performing and the means for comparing are each implemented with a program written in a rule-based language.

7. The computer of claim 5, wherein the means for providing includes means for performing Huffman coding on each one of said plurality of objects in the single inheritance type hierarchy.

8. The computer of claim 5, wherein the means for providing includes:
- means for determining a maximum number of siblings for each level of the single inheritance type hierarchy;
- means for determining for each level of the single inheritance type hierarchy a minimum number of bits $M_L$ needed to uniquely number a maximum number of siblings for the respective level;
- means for adding together the minimum number of bits $M_L$ for each level in the single inheritance type hierarchy to obtain a value B, which equals a total number of bits necessary to uniquely identify each one of the plurality of objects in the database;
- means for assigning each one of the plurality of objects in the database a value $A_N$ which has $M_L$ bits, wherein the value $A_N$ is unique for each of said objects with respect to its siblings;
- means for concatenating the values $A_N$ for each one of the plurality of objects, with a left-most bit being a first digit of the value $A_N$ of a top level object, and successively next left-most bits that are concatenated being the remaining digits of the top level object followed by the values $A_N$ of each of an object's ancestors; and
- means for right-filling with 0's the concatenated values of $A_N$ until the concatenated values of $A_N$ with right-filled 0's has the total number of bits B to form the binary bit pattern for each one of the plurality of the objects.

9. The computer of claim 8, wherein the means for providing further includes means for forming said mask, subsequent to determining $M_L$ and B, by filling left-most bits of a binary number B bits long with a number C of 1's and right-filling with 0's, where C=

$$C = \sum_{L=1}^{Q} M_L,$$

Q being the level L of an object having the mask that is being formed.

* * * * *